United States Patent
Jensen et al.

(10) Patent No.: US 12,539,103 B2
(45) Date of Patent: Feb. 3, 2026

(54) SYSTEM, METHOD AND/OR COMPUTER READABLE MEDIUM FOR AN IMPROVED INSTRUMENT GUIDANCE APPROACH IN ULTRASOUND IMAGING

(71) Applicant: GE Precision Healthcare LLC, Waukesha, WI (US)

(72) Inventors: Henrik Jensen, Charlottenlund (DK); Jacob Bjerring Olesen, Copenhagen (DK)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 0 days.

(21) Appl. No.: 18/764,231

(22) Filed: Jul. 4, 2024

(65) Prior Publication Data
US 2026/0007391 A1    Jan. 8, 2026

(51) Int. Cl.
A61B 8/00    (2006.01)

(52) U.S. Cl.
CPC ............ *A61B 8/463* (2013.01); *A61B 8/4461* (2013.01); *A61B 8/4483* (2013.01); *A61B 8/469* (2013.01)

(58) Field of Classification Search
CPC ..... A61B 8/463; A61B 8/4461; A61B 8/4483; A61B 8/469
See application file for complete search history.

(56) References Cited

U.S. PATENT DOCUMENTS

| | | | |
|---|---|---|---|
| 5,186,176 A | * | 2/1993 | Hiki .......................... A61B 8/56 600/440 |
| 6,612,991 B2 | | 9/2003 | Sauer et al. |
| 6,689,067 B2 | | 2/2004 | Sauer et al. |
| 8,172,753 B2 | | 5/2012 | Halmann |
| 9,480,457 B2 | | 11/2016 | Kondou et al. |
| 9,517,049 B2 | | 12/2016 | Nozaki et al. |
| 9,610,094 B2 | | 4/2017 | Yoshida et al. |
| 10,039,524 B2 | * | 8/2018 | Ohuchi ............... G06F 3/04883 |
| 11,969,295 B2 | * | 4/2024 | Taniguchi ........... G01S 7/52077 |
| 2006/0241452 A1 | * | 10/2006 | Cerofolini ................ A61B 8/14 600/447 |
| 2010/0022871 A1 | * | 1/2010 | De Beni ............... A61B 8/0833 600/443 |
| 2012/0136256 A1 | * | 5/2012 | Nozaki ................... A61B 8/469 600/459 |

(Continued)

*Primary Examiner* — Adil Partap S Virk
(74) *Attorney, Agent, or Firm* — Daugherty & Del Zoppo Co. LPA

(57) ABSTRACT

An ultrasound imaging system includes a probe with a head having a first width along a long axis and a transducer array at the probe head and having a second width along the long axis, wherein the first width is greater than the second width, and the transducer array is configured to generate an electrical signal indicative of received echoes. The ultrasound imaging system further includes a beamformer configured to generate a sector shaped image based on the electrical signal, an image enhancer configured to generate a graphical vertical trajectory corresponding to a vertical line from an end of the head into the sector shaped image, and a display configured to display the graphical vertical trajectory superimposed over the sector shaped image to visually distinguishes a first region of the image projecting directly under the head from a second region of the image not projecting directly under the head.

20 Claims, 9 Drawing Sheets

(56) References Cited

U.S. PATENT DOCUMENTS

| | | | |
|---|---|---|---|
| 2012/0157841 A1* | 6/2012 | Glaenzer | A61B 10/0241 |
| | | | 600/439 |
| 2014/0276057 A1* | 9/2014 | Lee | A61B 8/463 |
| | | | 600/440 |
| 2017/0007207 A1* | 1/2017 | Gauthier | A61B 8/145 |
| 2017/0196532 A1* | 7/2017 | Choi | G01S 7/52087 |
| 2018/0085096 A1* | 3/2018 | Brandl | A61B 8/469 |
| 2022/0104886 A1* | 4/2022 | Blanchard | A61B 17/3403 |
| 2024/0000430 A1* | 1/2024 | Chen | A61B 8/466 |
| 2024/0122573 A1* | 4/2024 | Dickie | G01S 15/899 |
| 2024/0225604 A1* | 7/2024 | Okamoto | A61B 8/4218 |
| 2025/0176934 A1* | 6/2025 | Xu | G06T 7/10 |

\* cited by examiner

SYSTEM, METHOD AND/OR COMPUTER READABLE MEDIUM FOR AN IMPROVED INSTRUMENT GUIDANCE APPROACH IN ULTRASOUND IMAGING

FIELD

The following generally relates to ultrasound, and finds particular application to ultrasound imaging, including an improved instrument guidance approach in ultrasound imaging.

BACKGROUND

Ultrasound imaging provides a real-time image with information about the interior of an object or a subject such as tissue, etc. With one example, an excitation pulse is provided to a transducer array. At least a sub-set of the elements of the array receive the pulse and converts the electrical pulse to a pressure wave/ultrasound signal. The pressure wave is transmitted by the transducer array during a transmit operation, propagates in a medium, and interacts with the medium. Such interaction results in, among other things, echoes, which are reflections back towards the transducer.

The elements receive the echoes during a receive operation and convert the reflections to analog signals. For each receive operation, the analog signals are amplified, converted to digital signals, and beamformed to produce a scan line of radio frequency (RF) data. With delay-and-sum beamforming, the digital signals are time delayed, weighted, and then summed to produce the scan lines. The scan lines are further processed (e.g., band-pass filtering, envelope detection, logarithmic compression, etc.), scan converted, and displayed as frame/2-D image (e.g., a B-mode image) of the tissue, etc.

FIGS. 1 and 2 schematically illustrate examples of ultrasound imaging probes 102 and 202. The ultrasound imaging probes 102 and 202 respectively include curved transducer arrays 104 and 204. With the curved transducer arrays 104 and 204, ultrasound beams 106 and 206 diverge, producing sector shaped beams, which are narrower in the near-field (108 and 208) and wider in the far field (110 and 210), providing a sector shaped ultrasound field-of-view (FOV), and, hence, image. Curved transducer arrays, such as the curved transducer arrays 104 and 204, combine advantages of sector arrays (a wider far field field-of-view relative to a linear array) and linear arrays (a wider near field field-of-view relative to sector arrays). A difference between the ultrasound imaging probes 102 and 202 is that a cable 120 extends from a probe head 112 of the probe 102, and a cable 220 extends from a handle 222 (which is connected to a probe head 212) of the probe 202.

Ultrasound imaging is also used to guide advancement of an instrument such as a biopsy needle, an ablation tool, a cautery device, etc. to tissue of interest being imaged. For guidance of an instrument along long sides of the probe heads 112 and 212 of the ultrasound imaging probes 102 and 202, center lines of the transducer arrays 104 and 204 have been superimposed on the display screen of the corresponding displayed ultrasound image and/or center marks have been added to the ultrasound imaging probes 102 and 202. However, vertical trajectories into the FOVs 106 and 206 of vertically oriented instruments 114 and 214 at an end 116 and an end $216_1$ (or an opposing end $216_2$) of the probe heads 112 and 212 of the ultrasound imaging probe 102 and 202 cannot be visually ascertained by the sonographer from the image.

This is at least in part because of the sector shape of the FOVs 106 or 206. For instance, where at imaging surfaces 118 and 218 respectively of ultrasound imaging probes 102 and 202, the transducer arrays 104 and 204, and, hence, the FOVs 106 and 206 are narrower than respective widths 120 and 220 of the probe heads 112 and 212 of the ultrasound imaging probes 102 and 202 (e.g., the widths 108 and 208), and the FOVs 106 and 206 fan out and are wider than the widths 120 and 220 of the probe heads 112 and 212 of the ultrasound imaging probes 102 and 202 in the far field (e.g., the widths 110 and 210). As such, the sonographer cannot readily know the point at which the instruments 114 and 214 will enter the FOVs 106 and 206 from the ends 116 and $216_1$ (and/or $216_2$) from the displayed images.

In view of at least the foregoing, there is an unresolved need for an improved instrument guidance approach in ultrasound imaging.

SUMMARY

Aspects of the application address the above matters, and others. This summary introduces concepts that are described in more detail in the detailed description. It should not be used to identify essential features of the claimed subject matter, nor to limit the scope of the claimed subject matter.

In one aspect, an ultrasound imaging system includes an ultrasound imaging probe. The ultrasound imaging probe includes a probe head having a first width along a long axis. The ultrasound imaging probe further includes a transducer array at the probe head and having a second width along the long axis. The first width is greater than the second width. The transducer array is configured to generate an electrical signal indicative of received echoes. The ultrasound imaging system further includes a beamformer configured to generate a sector shaped image based on the electrical signal. The ultrasound imaging system further includes an image enhancer configured to generate a graphical vertical trajectory corresponding to a vertical line from an end of the probe head into the sector shaped image. The ultrasound imaging system further includes a display configured to display the graphical vertical trajectory superimposed over the sector shaped image. The graphical vertical trajectory visually distinguishes a first region of the sector shaped image projecting directly under the probe head from a second region of the sector shaped image not projecting directly under the probe head.

In another aspect, a computer-implemented method includes receiving, at a transducer array in a probe head of an ultrasound imaging probe, echoes generated in response to an interaction between an emitted ultrasound pressure wave and matter. The computer-implemented method further includes generating an electrical signal indicative of received echoes. The head has a first width along a long axis, the transducer array has a second width along the long axis, and the first width is greater than the second width. The computer-implemented method further includes beamforming the electrical signal to generate a sector shaped image. The computer-implemented method further includes generating a graphical vertical trajectory corresponding to a vertical line from an end of the probe head into the sector shaped image. The computer-implemented method further includes displaying the graphical vertical trajectory superimposed over the sector shaped image, wherein the graphical vertical trajectory visually distinguishes a first region of the image projecting directly under the probe head from and a second region of the sector shaped image outside of the region directly under the probe head.

In another aspect, a computer readable medium is encoded with computer executable instructions, which, when executed by a processor, cause reception, at a transducer array in a probe head of an ultrasound imaging probe, echoes generated in response to an interaction between an emitted ultrasound pressure wave and matter. The instructions further cause generation of an electrical signal indicative of received echoes. The head has a first width along a long axis, the transducer array has a second width along the long axis, and the first width is greater than the second width. The instructions further cause generation of a sector shaped image based on the electrical signal. The instructions further cause generation of a graphical vertical trajectory corresponding to a vertical line from an end of the probe head into the sector shaped image. The instructions further cause display of the graphical vertical trajectory superimposed over the image. The graphical vertical trajectory visually separates a first region of the sector shaped image corresponding to a rectangular plane projecting from the probe head from a remainder of the sector shaped image.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings in which like references indicate similar elements.

DETAILED DESCRIPTION

Figure 1:
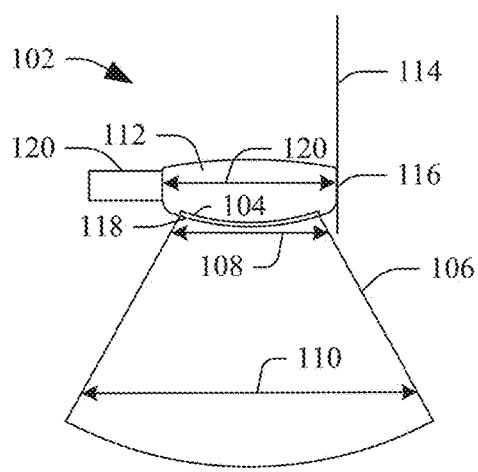
FIG. 1 schematically illustrates an example ultrasound imaging probe with a curved array and a cable extending from a side of the probe head, in accordance with an aspect of an embodiment(s) herein.

Embodiments of the present disclosure will now be described, by way of example, with reference to the figures, in which graphical indicia is superimposed over sector shaped images generated from echoes received with a curved transducer array of an ultrasound imaging probe to visually enhance vertical trajectories from ends of a probed head of the ultrasound imaging probe through the sector shaped images. In one instance, the graphical indicia is automatically superimposed over the sector shaped images and can then be toggled on and off. In another instance, the graphical indicia is superimposed over the sector shaped images on-demand and can then be toggled on and off, e.g., via a control such as a physical control (e.g., a button, a knob), etc., a touch screen control (e.g., a graphic, an icon, etc.), voice command, etc.

As discussed above, ultrasound imaging provides a real-time image with information about the interior of an object or a subject such as tissue, etc. With some ultrasound imaging probes, for guidance of an instrument along long sides of the ultrasound imaging probe, a center line of the transducer array is superimposed on the display screen over the ultrasound image and/or a center mark is the ultrasound imaging probes. As further described above, however, a trajectory into a FOV of vertically oriented instrument at an end a probe head of an ultrasound imaging probe with curved transducer array cannot be visually ascertained by the sonographer from the displayed image, e.g., at least in part because a width of the sector shape of the FOV at imaging surface is narrower than the width of the probe head of the ultrasound imaging probe and the FOV fans out and is wider than the width of the probe head of the ultrasound imaging probe in the far field.

As described in greater detail below, the graphical indicia described herein provides vertical trajectories through the trapezoidal shaped images from ends of the probe head of the ultrasound imaging probe, improving existing technology and at least overcoming shortcomings of the existing technology discussed herein at least by not only displaying the acoustic aperture, but also indicating the projection from the physical ultrasound imaging probe. Examples of such graphical indicia include solid or dashed lines from an end or ends of the probe head of the ultrasound imaging probe through the field of view. In another example, graphical indicia visually enhances a region directly below the probe head of the ultrasound imaging probe and/or visually suppresses regions outside of the region directly below the probe head of the ultrasound imaging probe. In another example, graphical indicia masks out regions outside of the region directly below the probe head of the ultrasound imaging probe.

In one instance, a type or model of the ultrasound imaging probe being used is utilized to determine a width of the head of the ultrasound imaging probe for the graphical indicia. The width information may be stored in a data structure such as a look-up table (LUT), a database, etc. The type or model may be determined automatically (e.g., communication between the ultrasound imaging probe and an ultrasound imaging console), entered or selected by a user from a list of available options, included within an imaging protocol, etc. In one or more of the examples, the graphical indica may represent the probe heads of the ultrasound imaging probe, including the probe heads of an ultrasound imaging probe where only a single end is available to advance the instrument and/or where both ends of the probe head of the ultrasound imaging probe are available to advance the instrument. In such an instance, the graphical indicia is based on the type or model of the ultrasound imaging probe. It is to be appreciated that the vertical trajectories provide a free-hand guide to guide an instrument and still allow an operator a high degree of freedom for which path to follow within the image plane.

Figure 3:
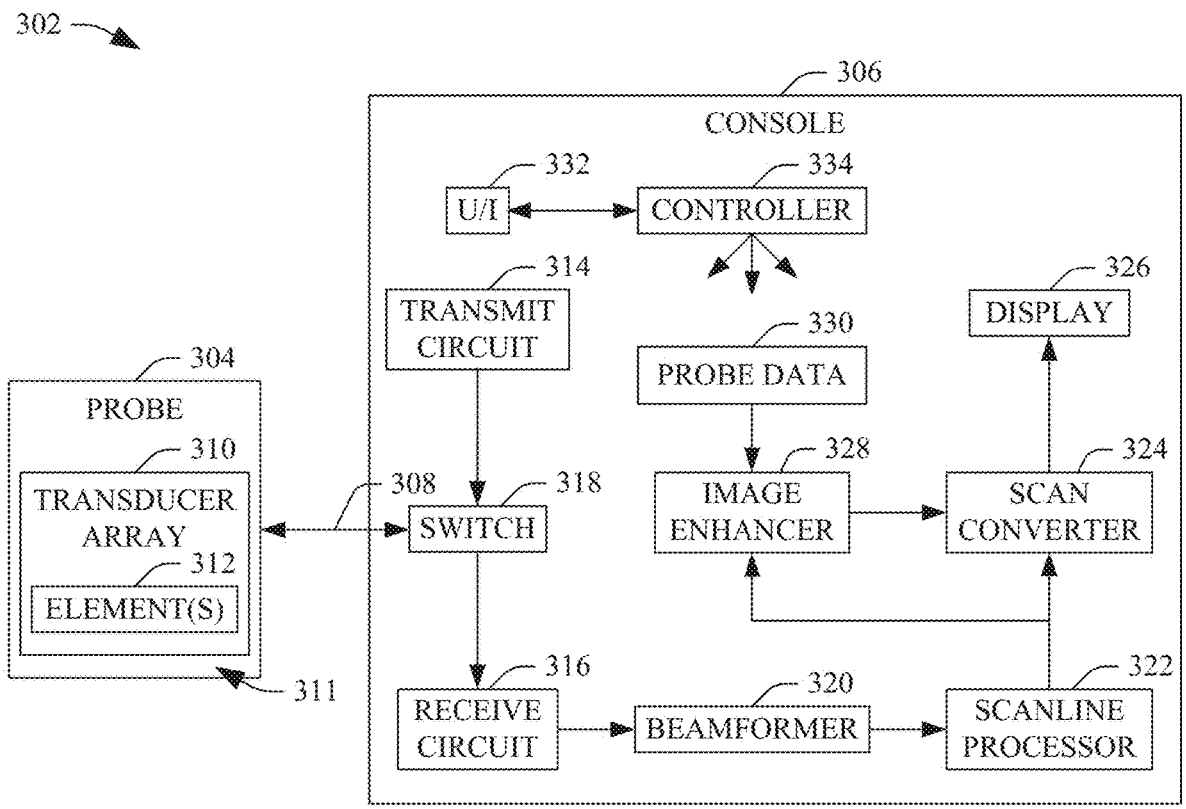
FIG. 3 schematically illustrates a non-limiting example of an imaging system configured for ultrasound imaging that includes an image enhancer and memory storing probe data, in accordance with an aspect of an embodiment(s) herein.

Turning now to FIG. 3, a non-limiting example of an ultrasound system 302 is schematically illustrated. The ultrasound system 302 includes an ultrasound imaging probe 304 and a console 306. In the illustrated embodiment, the ultrasound imaging probe 304 and the console 306 interface with each other via a communication channel 308. In one instance the communication channel 308 includes wired technology, e.g., complimentary interfaces and a cable therebetween. Additionally, or alternatively, the communication channel 308 includes wireless technology, e.g., Wi-Fi, etc. In yet another instance, the ultrasound imaging probe 304 and the console 306 are integrated in a same housing such as part of a hand-held ultrasound system, etc.

The ultrasound imaging probe 304 includes a transducer array 310. The transducer array 310 is disposed at a probe head 311. The transducer array 310 includes one or more transducer elements 312. Examples of suitable arrays include 64, 128, 192, 256, and/or other arrays, including larger and smaller arrays, one dimensional (1-D) or two dimensional (2-D), etc. In this example, the transducer array 310 includes a curved (convex), linear, and/or otherwise shaped array, which can be fully populated, sparse, etc. The one or more transducer elements 312 are configured to convert an excitation electrical signal to an ultrasound pressure field and convert a reflected ultrasound pressure field to an electrical signal.

By way of non-limiting example, the one or more transducer elements 312 can be selectively excited via an excitation electrical (pulsed) signal, which causes at least a sub-set of the transducer elements 312 to transmit an ultrasound pressure field into an examination or scan field of view. The ultrasound pressure field may include a focused ultrasound beam, a defocused (spherical) wave, and/or other ultrasound signal. The one or more transducer elements 312 receive echo signals and generate analog electrical signals indicative thereof. The echo signals are generated in response to the transmitted ultrasound pressure field interacting with structure, such as tissue and/or blood cells flowing in a portion of a vessel.

The console 306 includes transmit circuit 314 configured to generate the excitation electrical signal provided to transducer array 310 for transmitting the ultrasound pressure field. In one instance, this includes generating delays for individual elements 312 of the transducer array 310, e.g., for transmit focusing, beam steering, etc.

The console 306 further includes a receive circuit 316 configured to receive the analog electrical signals from the at least one element and pre-process the analog electrical signals, e.g., amplify, digitize, focus, and/or otherwise process the analog electrical signals. For example, in one instance the receive circuit 316 includes an amplifier and a corresponding analog to digital converter (ADC) for each element, where each amplifier amplifies a corresponding analog electrical signal from a micro-volt level to a voltage range of the ADC.

The console 306 further includes a switch ("SW") 318 configured to switch between the transmit circuit 314 and the receive circuit 316, e.g., by electrically connecting the transmit circuit 314 to the transducer array 310 for a transmit operation and electrically connecting the receive circuit 316 to the transducer array 310 for a receive operation. In an alternative instance, separate switches are employed for each of the transmit circuit 314 and the receive circuit 316.

The console 306 further includes a beamformer 320. For receive operations, the beamformer 320 is configured to beamform, e.g., via delay-and-sum (e.g., a matched-filter beamformer, etc.) and/or other beamforming, the signals from the receive circuit 316 and construct a scanplane of scanlines of radiofrequency (RF) data for the echoes for each receive operation. With delay-and-sum beamforming, the digital signal for each element is delayed to align the signals in time, amplified, and then summed. In one instance, a matched filter matched to an expected received echo-pulse shape (bandwidth) operates on the signals.

The console 306 further includes a scanline processor 322. When configured for I/Q demodulation, the scanline processor 322 down mixes the RF signal and optionally applies low pass filtering and/or decimation. This may include employing a Hilbert Transform, a combination of a Complex-Demodulation Band Pass Filter and optional decimation, and/or other processing. The scanline processor 322 detects, extracts and outputs an envelope (i.e., an amplitude) of the I/Q signal (or the RF signal where I/Q modulation is omitted). In one instance, this is achieved using a Hilbert Transform and/or other approach.

The scanline processor 322 compresses the extracted envelope, reducing the dynamic range, e.g., to reduce the dynamic range to a predetermined display precision by a logarithmic (log)-based dynamic range compression and/or otherwise, and outputs a scanline. The scanline processor 322 outputs the processed scanlines as a frame/image (e.g., a B-mode image). The scanline processor 322 may apply other processing such as filtering (e.g., via a Finite Impulse Response (FIR) filter, an Infinite Impulse Response (IIR) filter, etc.), time gain compensation (TGC), noise rejection, and/or other processing.

The console 306 further includes a scan converter 324 and a display 326. The scan converter 324 is configured to scan convert the compounded image into a coordinate system of the display 326. The scan converter 324 can be configured to employ analog and/or digital scan converting techniques. The scan converted data can be displayed on the display 326 and/or other display monitor.

The console 306 further includes an image enhancer 328. The image enhancer 328 is configured to generate graphical indicia to display over images. In one instance, this includes generating graphical indicia that are superimposed over sector shaped images generated from echoes received with a curved transducer array of an ultrasound imaging probe to visually enhance vertical trajectories from sides of the probe head 311 vertically through the trapezoidal shaped images. In this example, probe data 330 stored in memory of the console 306 at least includes a width of the probe head 311 along a long side of each type and/or model of ultrasound imaging probe that can be utilized to guide an instrument along one or more ends of the probe head 311 of the ultrasound imaging probe 304.

Non-limiting examples of the ultrasound imaging probe 304 are discussed herein and include at least the ultrasound imaging probe 102 and the ultrasound imaging probe 202, and also contemplate other ultrasound imaging probes and/or ultrasound imaging probe configurations. With the ultrasound imaging probes 102 and 202, the widths 108 and 208 of the probe heads 112 and 212 are included in the probe data 330. In instances in which the ultrasound imaging probe 102 or 202 is going to be utilized with the console 306, the image enhancer 328 obtains the width 120 or 220 from the probe data 330 based on the type and/or model of the ultrasound imaging probe 102 or 202. For example, in one instance, the probe data 330 includes a cross-reference or mapping between type and/or model and the physical width of the long side for each type and/or model of the ultrasound imaging probe.

With the widths 120 and 220, depending on which of the ultrasound imaging probes 102 and 202 is being utilized with the console 306 to guide vertical advancement of the instrument from the end 116 and or the end 216$_1$ and/or 216$_2$, the image enhancer 328 can generate graphical indicia based on the image from the scanline processor 322, e.g., by aligning the graphical indicia based on a center of the displayed image and the width, where, in one instance, a vertical trajectory is placed at a distance from the center of the image by half of the width, which places the vertical trajectory at the end of the probe head 311. For example, where the width=N and the center is at pixel (x,y), the graphical indicia is placed a distance of N/2 from pixel (x,y). In one instance, a vertical trajectory is placed at one end of the probe head 311, and, in another instance, another vertical trajectory is also placed at the other end of the probe head 311.

As briefly described above and further described in greater detail below, examples of graphical indicia include solid or dashed lines from an end or ends of the probe head 311 of the ultrasound imaging probe 304 through the sector image, visually enhancement of a region directly below the probe head 311 of the ultrasound imaging probe 304 and/or visually suppression of regions outside of the region directly below the probe head 311 of the ultrasound imaging probe 304, masking out regions outside of the region directly below the probe head 311 of the ultrasound imaging probe 304, etc., with or without graphical indicia representing the probe head 311 of the ultrasound imaging probe 304, including an ultrasound imaging probe 304 where only a single end is available to advance the instrument and/or where both ends are available to advance the instrument.

As briefly described above, with existing ultrasound imaging technology, a trajectory into the sector shape image of a vertically oriented instrument at an end of the probe head 311 of the ultrasound imaging probe 304 with a curved transducer array cannot be visually ascertained by the sonographer from the displayed sector shape image, e.g., at least in part because a width of the sector shape image in the near field (e.g., at 108 and 208) is narrower than the widths 120 and 220 of the probe heads 112 and 212 of the ultrasound imaging probe 102 and 202, and a width of the sector shape image in the far field (e.g., at 110 and 210) is wider than the widths 120 and 220 of the probe heads 112 and 212 of the ultrasound imaging probe 102 and 202. The approach described herein overcomes at least this shortcoming of the existing ultrasound imaging technology, improving the existing ultrasound imaging technology.

The console 306 further includes a user interface ("UI") 332. The user interface 332 includes one or more input devices (such as a button, a knob, a slider, a touch screen, a mouse, a keyboard, etc.) and/or other input device, and/or one or more output devices such as a visible, audible, etc. indicator. The user interface 332 allows a user to control an operation of the ultrasound imaging system 302. For example, in one instance, the user interface 332 receives an input indicative of a type or model of the ultrasound imaging probe being used with the console 306, an imaging protocol that identifies the type or model of the ultrasound imaging probe for the protocol, etc. In another instance, the console 306 receives such information over the communication channel 308 from the ultrasound imaging probe 304.

The console 306 further includes a controller 334. The controller 334 includes a processor(s) such as a microprocessor (uP), a central processing unit (CPU), a graphics processing unit (GPU), etc., and memory, which stores the adaptive spatial compounding algorithm described herein. The controller 334 is configured to control one or more of the transmit circuit 314, the receive circuit 316, the switch 318, the beamformer 320, the scanline processor 322, the scan converter 324, the display 326, the image enhancer 328, and/or the user interface 332. One or more of these components of the console 306 can be implemented in software and/or hardware.

As briefly described above, the image enhancer 328 is configured to generate graphical indicia that is superimposed over sector shaped images generated from echoes received with a curved transducer array of an ultrasound imaging probe to visually enhance vertical trajectories through the trapezoidal shaped images at ends of the ultrasound imaging probe. With the ultrasound imaging probe 102, the instrument 114 can be advanced from only the end 116 of the probe head 112, and with the ultrasound imaging probe 202, the instrument 214 can be advanced from either or both of the ends 216$_1$ and/or 216$_2$ of the probe head 212. FIGS. 4, 5, 6, 7, 8 and 9 include non-limiting examples of sector shaped images with such graphical indicia superimposed thereover.

Figure 4:
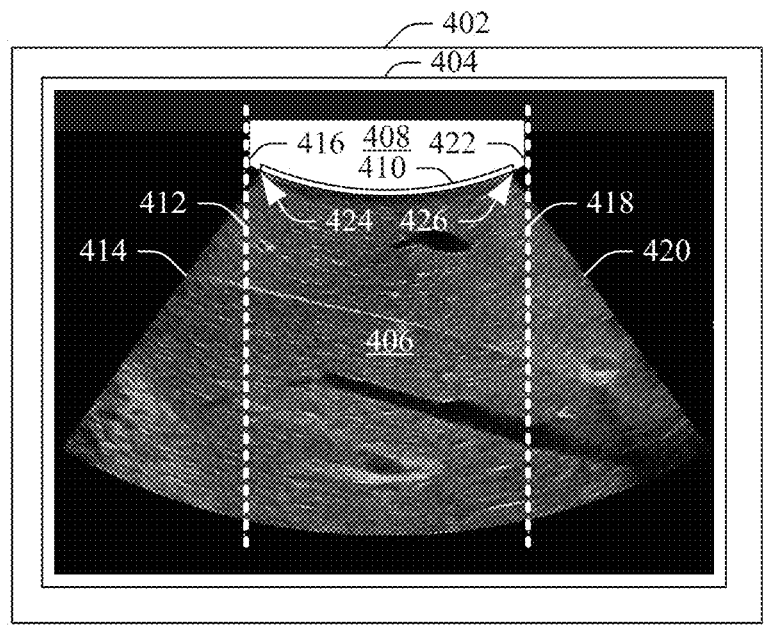
FIG. 4 illustrates a non-limiting example of a display of a sector shaped ultrasound image with graphical indicia representing a probe head with a curved transducer array of an ultrasound imaging probe and including dotted line vertical trajectories at ends of the probe head and into the sector shaped ultrasound image, in accordance with an aspect of an embodiment(s) herein.

Initially referring to FIG. 4, a display monitor 402 at least includes an imaging viewing region 404 for displaying images is graphically illustrated. In this example, the ultrasound imaging probe 304 includes the ultrasound imaging probe 202. In another example, the ultrasound imaging probe 304 could alternatively include the ultrasound imaging probe 102 or other ultrasound imaging probe configured with a curved transducer array. In this example, a sector shaped image 406 is generated based on echoes received by the ultrasound imaging probe 202 and displayed in the imaging viewing region 404.

In this example, graphical indicia include a graphical representation 408 of the probe head 212 of the ultrasound imaging probe 202. More specifically, the graphical representation 408 includes a head of an ultrasound imaging probe where both ends 416 and 422 are available for advancing an instrument. In this example, the graphical representation 408 further includes a graphical representation of a transducer array 410. The graphical indicia further include a first dashed vertical line 412 on a first side 414 of the sector shaped image 406 next to a first end 416 of the graphical representation 408 and a second dashed vertical line 418 on a second side 420 of the sector shaped image 406 next to a second end 422 of the graphical representation 408.

In one instance, the graphical indicia can be automatically superimposed over the sector shaped image 406 and then can be toggled on and off. In another instance, the graphical indicia is superimposed over the sector shaped image 406 on-demand and then can be toggled on and off. Again, the graphical indicia visually provides trajectories for an instrument for vertical advancement along the end 416 of the probe head 408 ultrasound imaging probe and/or along the end 422 of the probe head 408 of the ultrasound imaging probe. Without the first dashed vertical line 412 and the second dashed vertical line 418, the sonographer would not know where the ends 416 and 422 of the probe head 212 of ultrasound imaging probe 202 were relative to the sector shaped image 406.

Figure 5:
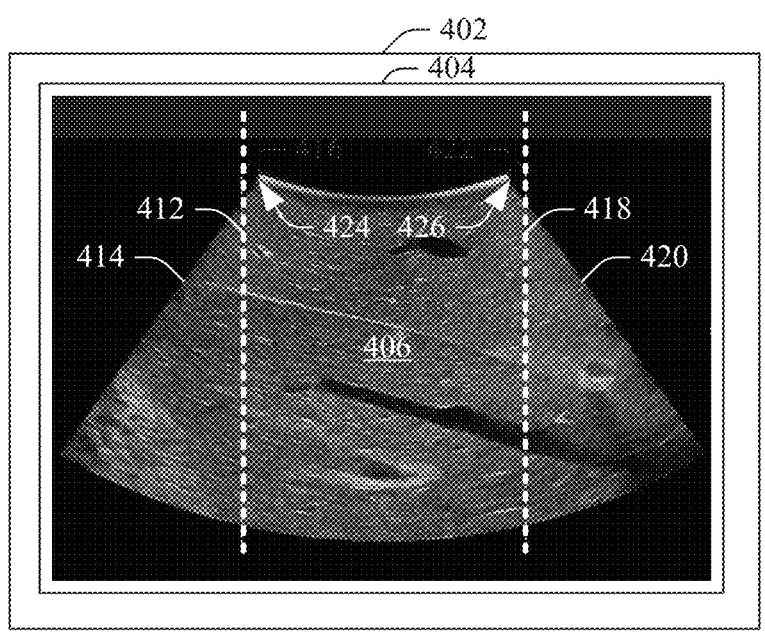
FIG. 5 illustrates a non-limiting example of a display of a sector shaped ultrasound image with graphical indicia including dotted line vertical line trajectories at ends of a head with a curved transducer array of the ultrasound imaging probe and into the sector shaped ultrasound image, in accordance with an aspect of an embodiment(s) herein.

FIG. 5 graphically illustrates a variation of FIG. 4. In one instance, the variation does not include the graphical representation 408 of the probe head 212 of the ultrasound imaging probe 202. In another instance, the variation in FIG. 5 allows the user to toggle the graphical representation 408 of the probe head 212 of the ultrasound imaging probe 202 on and off, and the graphical representation 408 of the probe head 212 of the ultrasound imaging probe 202 is toggled off in FIG. 5. In another variation, the user can toggle off the first dashed vertical line 412 and/or the second dashed vertical line 418, or the first dashed vertical line 412, the second dashed vertical line 418, and/or the graphical representation 408 of the probe head 212 of the ultrasound imaging probe 202.

Figure 6:
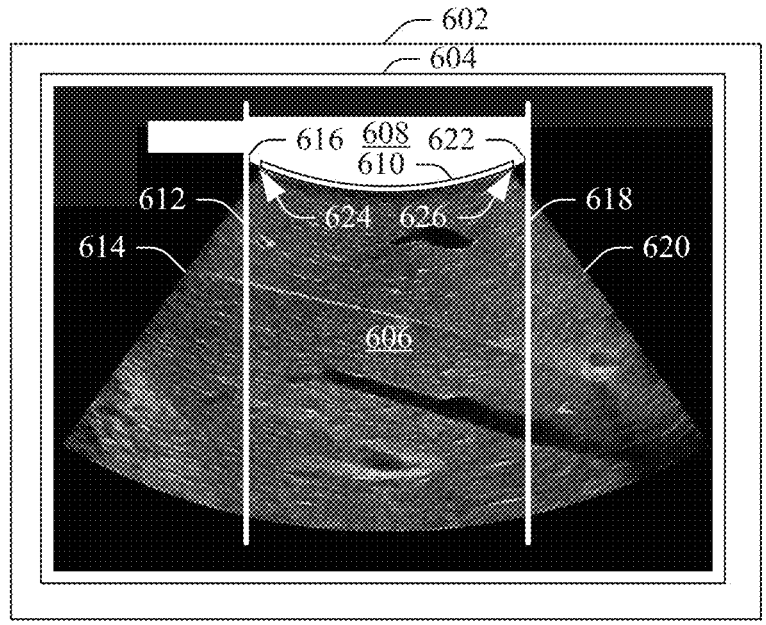
FIG. 6 illustrates a non-limiting example of a display of a sector shaped ultrasound image with graphical indicia representing a probe head with a curved transducer array of another type of ultrasound imaging probe and including solid line vertical trajectories at ends of the probe head of the ultrasound imaging probe and into the sector shaped ultrasound image, in accordance with an aspect of an embodiment(s) herein.

Turning to FIG. 6, a display monitor 602 at least includes an imaging viewing region 604 for displaying images is graphically illustrated. In this example, the ultrasound imaging probe 304 includes the ultrasound imaging probe 102. In another example, the ultrasound imaging probe 304 could alternatively include the ultrasound imaging probe 202 or other ultrasound imaging probe configured with a curved transducer array. In this example, a sector shaped image 606 is generated based on echoes received by the ultrasound imaging probe 102 and displayed in the imaging viewing region 604.

In this example, graphical indicia includes a graphical representation 608 of the probe head 112 of the ultrasound imaging probe 102. More specifically, the graphical representation 608 includes an ultrasound imaging probe where only one of the ends are available for advancing an instrument. In this example, the graphical representation 608 further includes a graphical representation of a transducer array 610. The graphical indicia further includes a first solid vertical line 612 on a first side 614 of the sector shaped image 606 next to a first end 616 of the graphical representation 608 and a second solid vertical line 618 on a second side 620 of the sector shaped image 606 next to a second end 622 of the graphical representation 608.

In one instance, the graphical indicia can be automatically superimposed over the sector shaped image 606 and then can be toggled on and off. In another instance, the graphical indicia is superimposed over the sector shaped image 606 on-demand and then can be toggled on and off. The graphical indicia visually provides the vertical line 618 of an instrument for advancement along the end 622 of the ultrasound imaging probe 102. Optionally, as shown, the graphical indicia may visually provide the vertical line 612 of the instrument, even though the instrument cannot be advanced along the first end 616 of the ultrasound imaging probe 102.

Figure 7:
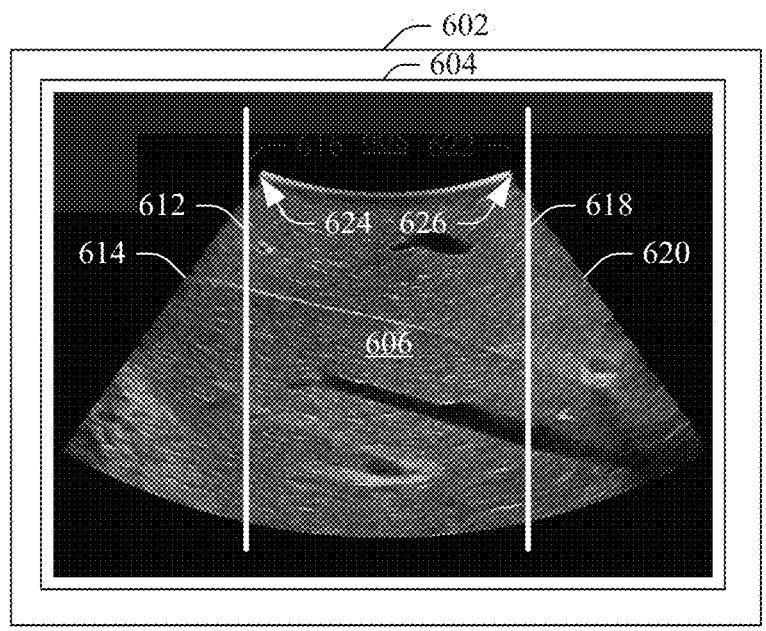
FIG. 7 illustrates a non-limiting example of a display of a sector shaped ultrasound image with graphical indicia including solid line vertical trajectories at ends of a probe head with a curved transducer array of the ultrasound imaging probe and into the sector shaped ultrasound image, in accordance with an aspect of an embodiment(s) herein.

FIG. 7 graphically illustrates a variation of FIG. 6. In one instance, the variation does not include the graphical representation 608 of the probe head 112 of the ultrasound imaging probe 102. In another instance, the variation in FIG. 7 allows the user to toggle the graphical representation 608 of the probe head 112 of the ultrasound imaging probe 102 on and off, and the graphical representation 608 of the probe head 112 of the ultrasound imaging probe 102 is toggled off in FIG. 7. In another variation, the user can toggle off the first solid vertical line 612 and/or the second solid vertical line 618, or the first solid vertical line 612, the second solid vertical line 618, and/or the graphical representation 608 of the probe head 112 of the ultrasound imaging probe 102.

Figure 8:
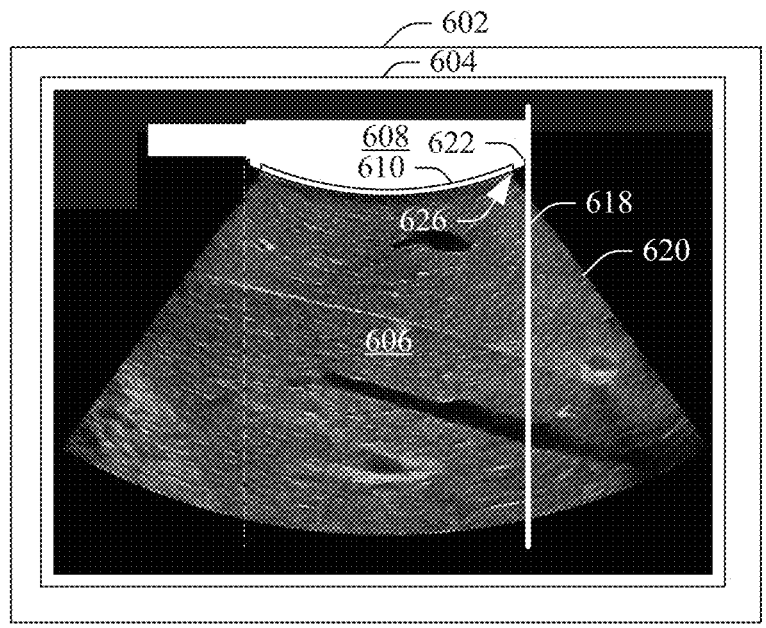
FIG. 8 illustrates a non-limiting example of a display of a sector shaped ultrasound image with graphical indicia representing a probe head with a curved transducer array of the type of ultrasound imaging probe and including a single solid line vertical trajectory at one end of the probe head of the ultrasound imaging probe and into the sector shaped ultrasound image, in accordance with an aspect of an embodiment(s) herein.
Figure 9:
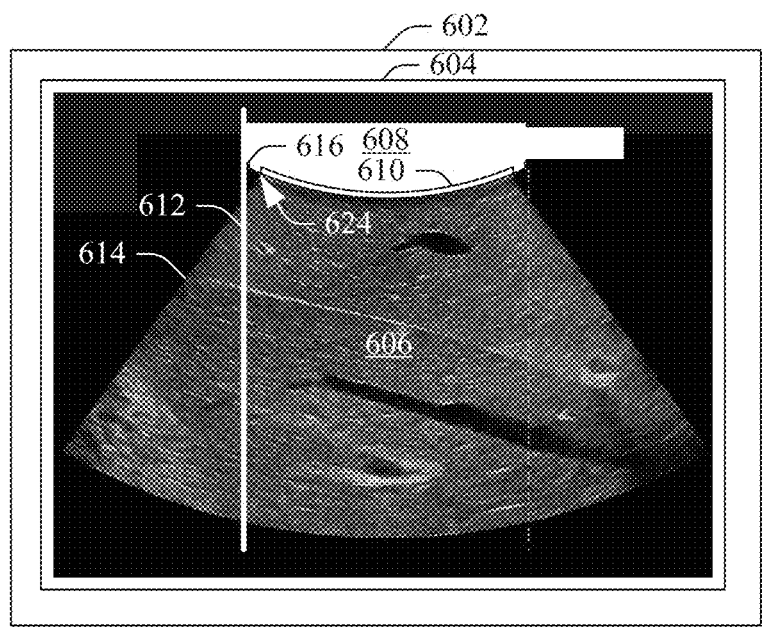
FIG. 9 illustrates a non-limiting variation of FIG. 8 showing an example of a display of the sector shaped ultrasound image with graphical indicia representing a probe head with a curved transducer array of the type of ultrasound imaging probe and including a single solid line vertical trajectory at the other end of the probe head of the ultrasound imaging probe and into the sector shaped ultrasound image, in accordance with an aspect of an embodiment(s) herein.

FIGS. 8 and 9 graphically illustrate further variations of FIG. 6. In FIG. 8, the first solid vertical line 612 is omitted since the instrument cannot be advanced at the end of the ultrasound imaging probe 102 where the cable 120 is attached. In FIG. 9, the second solid vertical line 618 is omitted since the instrument cannot be advanced at the end of the ultrasound imaging probe 102 where the cable 120 is attached. In FIG. 8, the ultrasound imaging probe 102 is oriented such that the cable 120 is to the left of the user observing the image 606, whereas in FIG. 9, the ultrasound imaging probe 102 has been rotated one hundred and eighty degrees (180°) such that the cable 120 is to the right of the user observing the image 606.

Figure 10:
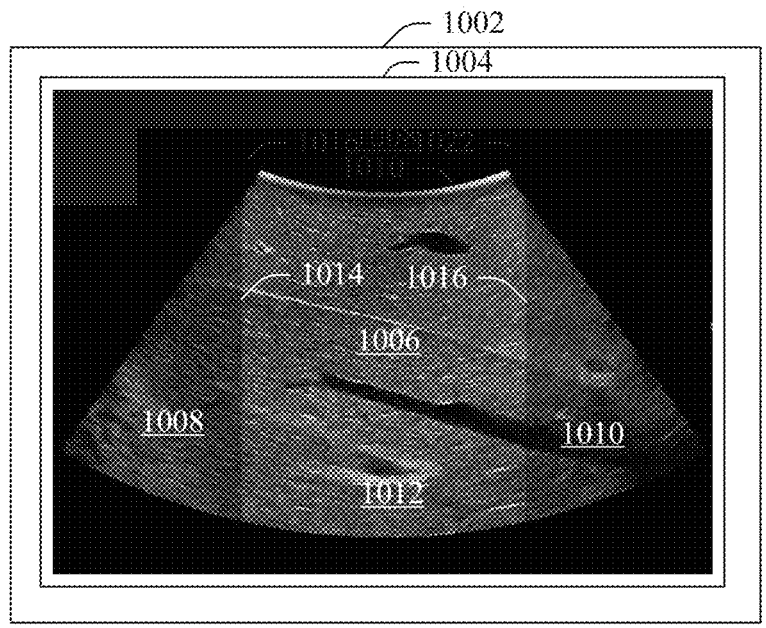
FIG. 10 illustrates a non-limiting example of a display of a sector shaped ultrasound image with graphical indicia visually enhancing a region of the FOV directly under the probe head of the ultrasound imaging transducer probe and/or visually suppressing regions of the FOV outside of the region directly under the probe head of the ultrasound imaging transducer probe, in accordance with an aspect of an embodiment(s) herein.

Turning to FIG. 10, a display monitor 1002 at least includes an imaging viewing region 1004 for displaying images is graphically illustrated. In this example, the ultrasound imaging probe 304 includes the ultrasound imaging probe 102, the ultrasound imaging probe 202 or other ultrasound imaging probe configured with a curved transducer array. In this example, a sector shaped image 1006 is generated based on echoes received by the ultrasound imaging probe 304 and displayed in the imaging viewing region 1004. Graphical indicia visually suppresses regions 1008 and 1010 of the image 1006 that are not directly under the probe head 311 of the ultrasound imaging probe 304 and/or visually enhances region 1012 the image 1006 that is directly under the probe head 311 of the ultrasound imaging probe 304. In this example, the graphical indicia darkens the regions 1008 and 1010 relative to a region 1012 directly under the probe head 311 of the ultrasound imaging probe 304.

Figure 11:
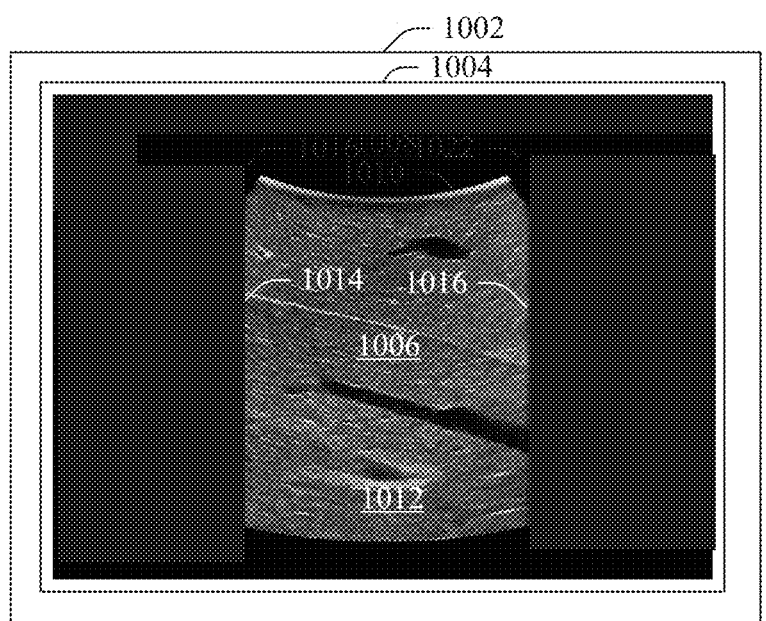
FIG. 11 illustrates a non-limiting example of a display of a sector shaped ultrasound image with graphical indicia masking out regions of the FOV outside of a region of the FOV directly under the probe head of the ultrasound imaging transducer probe, in accordance with an aspect of an embodiment(s) herein.

In this example, the darkening results in visibly observable boundaries 1014 and 1016 in the image 1006. FIG. 11 graphically illustrates a variation of FIG. 10. In this variation, the graphical indicia visually masks the regions (the regions 1008 and 1010 in FIG. 10) of the sector shaped image 1006 that are not directly under the probe head 311 of the ultrasound imaging probe 304. In this example, the masking similarly results in visibly observable boundaries 1014 and 1016 in the sector shaped image 1006, leaving visible only the region 1012 directly under the probe head 311 of the ultrasound imaging probe 304. In general, the region 1006 directly under the probe head 311 of the ultrasound imaging probe 304 is a rectangular plane extending from the end or ends of the probe head 311 (e.g., from the end 116 for the probe 102 and from the end $216_1$ and/or $216_2$ for the probe 202).

Although the above figures are described in connection with a curved transducer array and sector shaped image, it is to be understood that in some embodiments the approach described herein is employed in connection with a configuration in which the ultrasound imaging probe 304 includes a linear and/or otherwise shape transducer array and the image is rectangular shaped to add graphical indicia that visually provides trajectories for an instrument for vertical advancement along one or both ends of the probe head 304. For example, in one instance, with a linear transducer array, the beamformed image would be rectangular shaped and would not show the ends of the ends of the probe head, and the approached described herein would superimpose the trajectories over the rectangular shaped image, showing paths for guiding the instrument for vertical advancement with respect to the ends of probe head.

Figure 12:
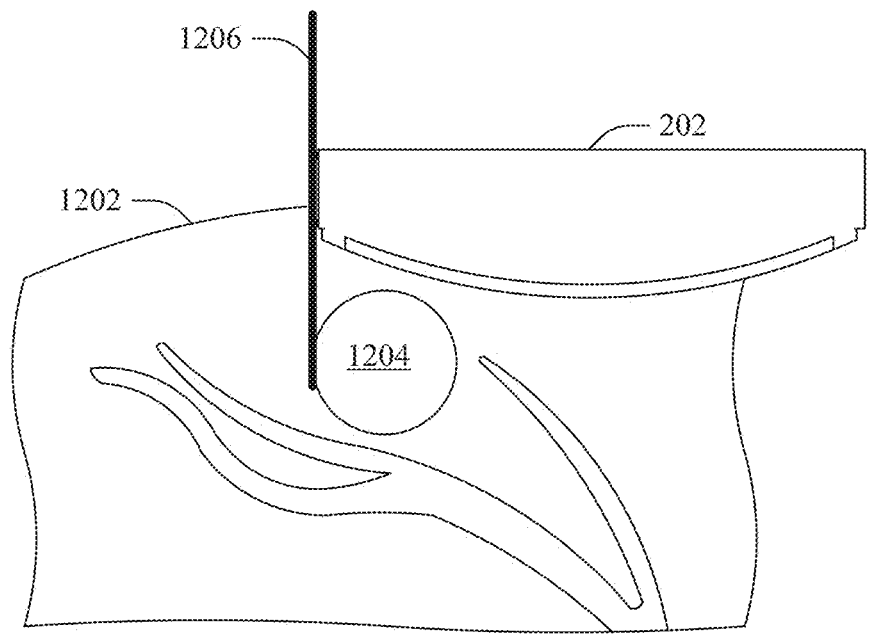
FIG. 12 illustrates a non-limiting example of a use-case scenario for marking a first side of anatomy containing an object of interest with a burn mark using the graphical indicia, in accordance with an aspect of an embodiment(s) herein.
Figure 13:
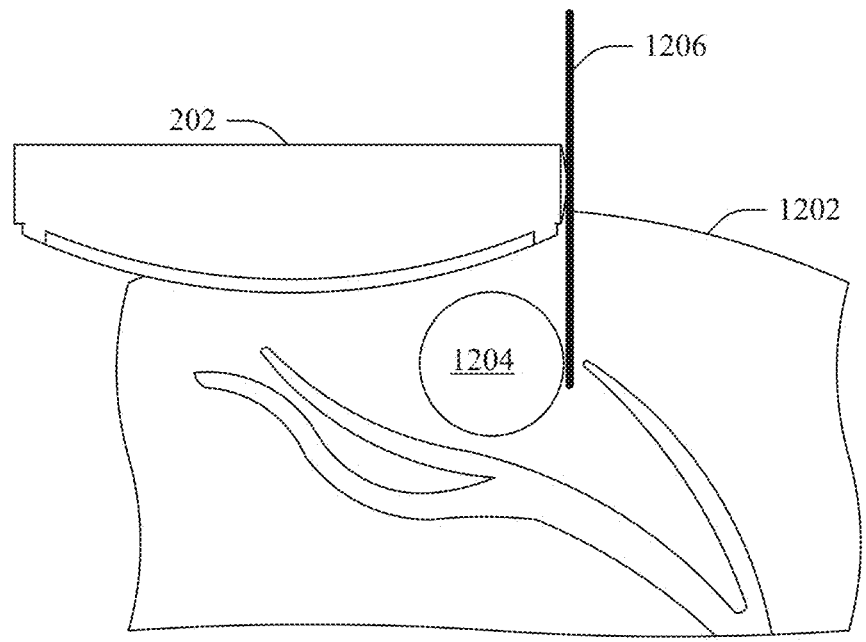
FIG. 13 illustrates a non-limiting example of the use-case scenario of FIG. 12 for marking a second opposing side of the anatomy containing the object of interest with another burn mark the graphical indicia, in accordance with an aspect of an embodiment(s) herein.

Turning to FIGS. 12 and 13, an example use-case scenario using the graphical indicia is graphically illustrated. In this example, the use-case scenario includes open and laparoscopic surgery where there is a need for marking (e.g., via a burn) the location of an object of interest such as a tumor, a lesion, etc. by marking a surface of anatomy including the object of interest. In general this can be achieved by aligning the vertical trajectory of the graphical indicia with the edge of the object of interest and/or the anatomy including the object of interest and then burning a mark on the surface of the anatomy adjacent to the object of interest. The mark indicates where to access the anatomy to reach the object of interest to the surgeon.

FIGS. 12 and 13 show a portion 1202 of a subject that includes an object of interest 1204. The ultrasound imaging probe 202 (FIG. 2) is utilized to locate the object of interest 1204 in the portion 1202 of the subject. For example, the ultrasound imaging probe 202 is moved around until the object of interest 1204 is located. Referring back to FIG. 9 and with continued reference to FIG. 12, the graphical indicia with at least the solid vertical line 612 along the end 616 of the ultrasound imaging probe 202 and into the sector image 606 is aligned with an end of the object of interest 1204. A cautery device 1206 or the like is then advanced along the solid vertical line 612 to the object of interest 1204 and used to mark the edge with a burn mark.

After the cautery device 1206 is retracted, the ultrasound imaging probe 202 is rotated one hundred and eighty degrees (180°), as shown in FIG. 13. Referring back to FIG. 8 and with continued reference to FIG. 13, the graphical indicia with at least the solid vertical line 618 along the end 622 of the ultrasound imaging probe 202 and into the sector image 606 is aligned with an opposing end of the object of interest 1204. The cautery device 1206 is then advanced along the solid vertical line 618 to the object of interest 1204, similar to advancing the cautery instrument 1206 along the solid vertical line 612, and used to mark the opposing edge with another burn mark. The cautery device 1206 is then retracted. The two burn marks mark the location that includes the object of interest 1204.

In instances where the ultrasound imaging probe 202 (FIG. 2) is utilized instead of the ultrasound imaging probe 102 (FIG. 1), the ultrasound imaging probe 202 need not be rotated one hundred and eighty degrees (1800) after making the burn mark based on the graphical indicia vertical line 412 at the edge 416 (or the graphical indicia vertical line 418 the edge 422). Rather, the ultrasound imaging probe 102 can be translated and the graphical indicia vertical line 418 at the edge 422 (or the graphical indicia vertical line 412 the edge 416) can be used to make the second burn mark on the opposite side of the object of interest 1204. Ageing, the two burn marks mark the location of the object of interest 1204. Furthermore, in some instances the procedure only makes a single burn mark or more than two burn marks.

Figure 14:
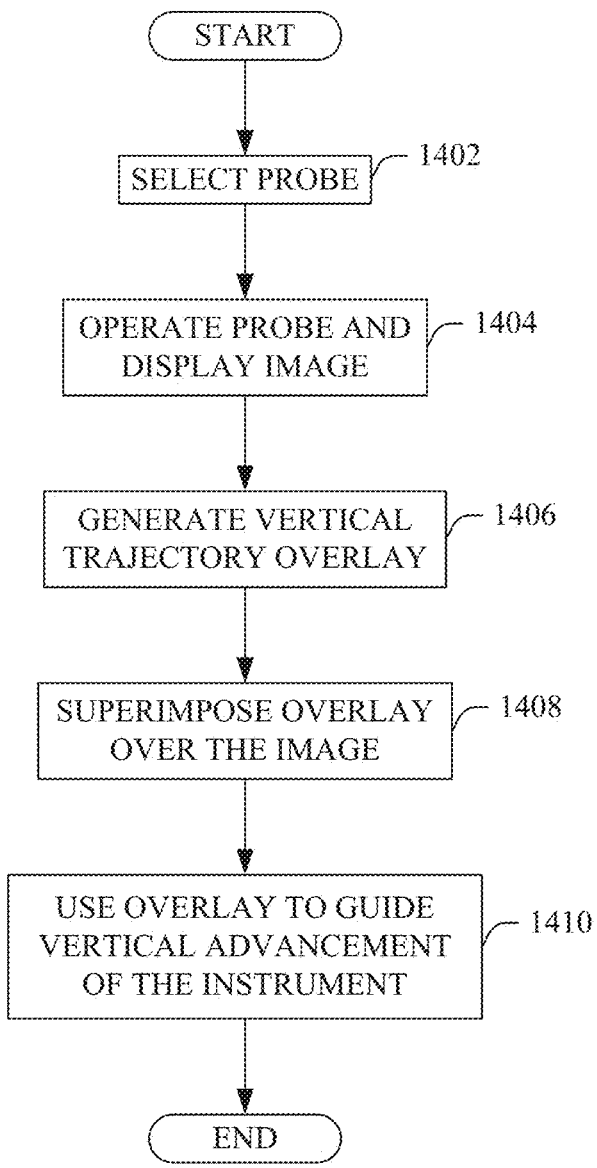
FIG. 14 illustrates a non-limiting example of a flow chart for a computer-implemented method for overlaying vertical trajectories over a sector image to indicate a portion of the sector image directly under the head of the ultrasound imaging probe, in accordance with an embodiment(s) herein.

FIG. 14 illustrates a non-limiting example of a flow chart for a computer-implemented method. It is to be appreciated that the ordering of the acts in the method is not limiting. As such, other orderings are contemplated herein. In addition, one or more acts may be omitted, and/or one or more additional acts may be included.

At 1402, the ultrasound imaging probe 304 is selected to be utilized in connection with an imaging mode for guiding vertical advancement of an instrument into a FOV, as described herein and/or otherwise. The imaging mode can be activated automatically, e.g., based on a selected imaging protocol, and/or on-demand, e.g., via the user turning on the mode via an on/off control. In one instance, thereafter, the mode can be toggled off and on by the user on-demand.

At 1404, the ultrasound imaging probe 304 is operated to image an interior of an object or subject, as described herein and/or otherwise. For example, the user can place the imaging surface of the ultrasound imaging probe 304 against the object or subject, where the ultrasound imaging probe 304 transmits a pressure wave that transverses the object or subject, receives reflections in response to the pressure wave interacting with matter inside of the object or subject, and generate and display a curve trapezoidal shaped ultrasound image on a display.

At 1406, graphical indicia is created based on the curve trapezoidal shaped ultrasound image and the ultrasound imaging probe 304 and, at 1408, the graphical indicia is superimposed over the curve trapezoidal shaped ultrasound image, as described herein and/or otherwise. For example, the image enhancer 328 (FIG. 3) receives the curve trapezoidal shaped ultrasound image and determines a center of the sector ultrasound image, obtains a width of the probe head 311 of the ultrasound imaging probe 304 along a direction of a long axis of the transducer array from the probe data 330, and generates the at least one vertical trajectory located from the center at a distance of one half of the width.

As discussed herein, in one instance the at least one vertical trajectory includes a single vertical trajectory, and, in another instance, the at least one vertical trajectory includes at least two vertical trajectories. As further discussed herein, in one instance, the graphical indicia further includes a graphical representation of the probe head 311 of the ultrasound imaging probe 304, and the at least one vertical trajectory is located at at least one end of the graphical representation of the probe head 311 of the ultrasound imaging probe 304.

At 1410, the at least one vertical trajectory is utilized to vertically guide an instrument into the FOV, as described herein and/or otherwise. As described herein, the instrument can be advanced free-hand and/or using a physical guide. Where the instrument is advanced free-hand, the user can continued to follow the at least one vertical trajectory to the object of interest and/or follow a different path, at least in part, to the object of interest. That is, the user is not confined to the at least one vertical trajectory, providing the user with a high degree of freedom for which path to follow within the image plane.

Figure 2:
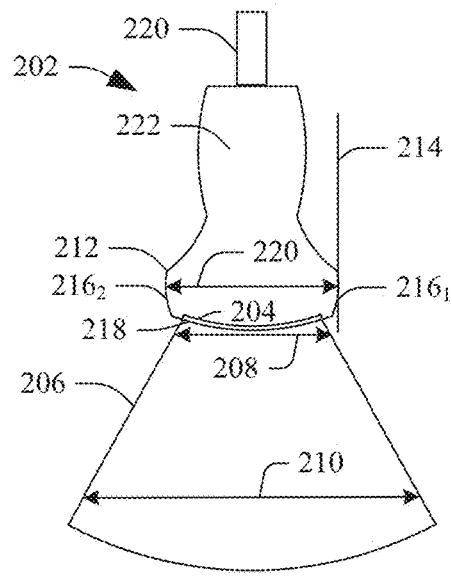
FIG. 2 schematically illustrates another example ultrasound imaging probe with a curved array and a cable extending from a back of the probe handle, in accordance with an aspect of an embodiment(s) herein.
Figure 15:
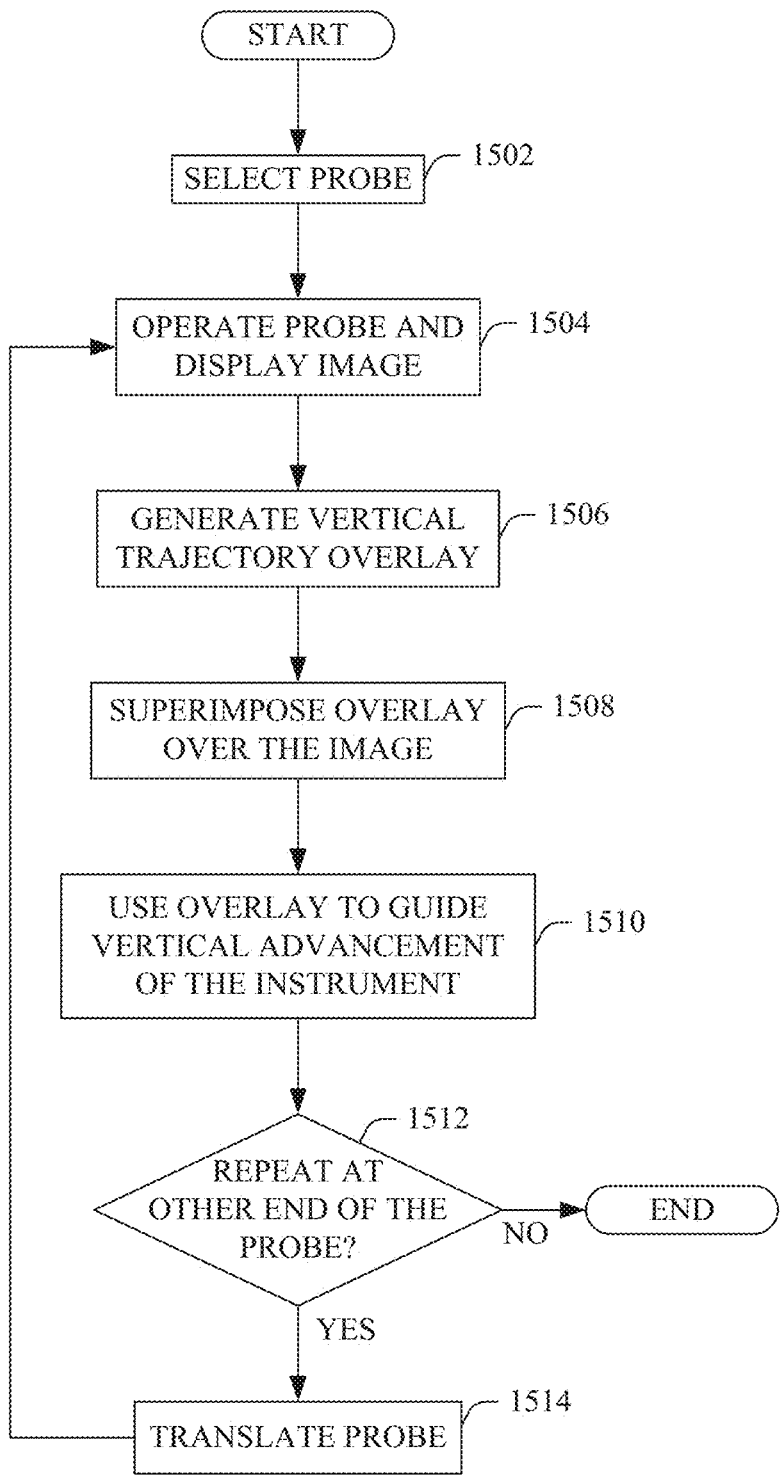
FIG. 15 illustrates a non-limiting example of a flow chart for a computer-implemented method for overlaying vertical trajectories over a sector image to indicate a portion of the sector image directly under the head of the ultrasound imaging probe in connection with the ultrasound imaging probe of FIG. 2, in accordance with an embodiment(s) herein.

FIG. 15 illustrates a non-limiting example of a flow chart for a computer-implemented method in connection with the ultrasound imaging probe 202 (FIG. 2). It is to be appreciated that the ordering of the acts in the method is not limiting. As such, other orderings are contemplated herein. In addition, one or more acts may be omitted, and/or one or more additional acts may be included.

At 1502, the ultrasound imaging probe 202 is selected to be utilized in connection with an imaging mode for guiding vertical advancement of an instrument into a FOV, as described herein and/or otherwise. The imaging mode can be activated automatically, e.g., based on a selected imaging protocol, and/or on-demand, e.g., via the user turning on the mode via an on/off control. In one instance, thereafter, the mode can be toggled off and on by the user on-demand.

At 1504, the ultrasound imaging probe 202 is operated to image an interior of an object or subject, as described herein and/or otherwise. For example, the user can place the imaging surface of the ultrasound imaging probe 202 against the object or subject, where the ultrasound imaging probe 202 transmits a pressure wave that transverses the object or subject, receives reflections in response to the pressure wave interacting with matter inside of the object or subject, and generate and display a curve trapezoidal shaped ultrasound image on a display.

At 1506, graphical indicia is created based on the curve trapezoidal shaped ultrasound image and the ultrasound imaging probe 202 and, at 1508, the graphical indicia is superimposed over the curve trapezoidal shaped ultrasound image, as described herein and/or otherwise. For example, the image enhancer 328 (FIG. 3) receives the curve trapezoidal shaped ultrasound image and determines a center of the sector ultrasound image, obtains a width of the ultrasound imaging probe 202 along a direction of a long axis of the transducer array from the probe data 330, and generates the vertical trajectories 412 and 418 based on the center and one half of the width.

As shown in FIGS. 4 and 5, both of the vertical lines 412 and 418 can be concurrently displayed. In another instance, the vertical lines 412 and 418 can be alternately displayed. Furthermore, as shown in FIG. 4, the graphical indicia can further include a graphical representation 408 of the probe head 212 of the ultrasound imaging probe 202, and the vertical lines 412 and 418 are located at the ends 416 and 422 of the graphical representation 408 of the probe head 212 of the ultrasound imaging probe 202.

At 1510, one or both (i.e., one at a time) of the vertical lines 412 and 418 can be utilized to vertically guide an instrument into the FOV, as described herein and/or otherwise. At 1512, it is determined whether both of the vertical lines 412 and 418 will be utilized to mark a region in which an object of interest is located. Where it is determined that both of the vertical lines 412 and 418 will be utilized, at 1514 the user translates the ultrasound imaging probe 102 between instrument advancement to align the vertical trajectories 412 and 418 with the object of interest, and acts 1504-1512 are repeated. Otherwise, the guidance ends. Again, the instrument can be advanced free-hand and/or using a physical guide.

Figure 16:
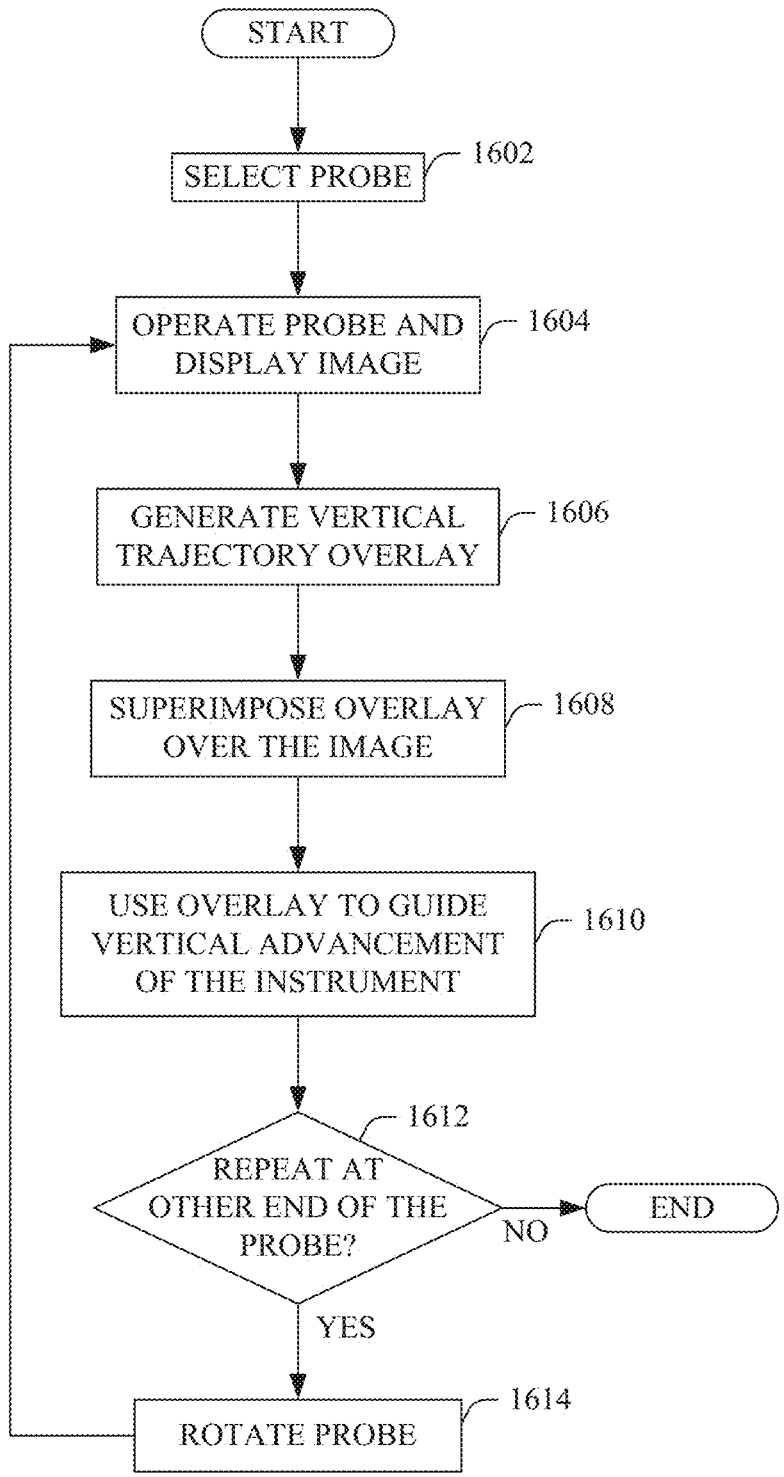
FIG. 16 illustrates another non-limiting example of a flow chart for a computer-implemented method for overlaying vertical trajectories over a sector image to indicate a portion of the sector image directly under the head of the ultrasound imaging probe in connection with the ultrasound imaging probe of FIG. 1, in accordance with an embodiment(s) herein.

FIG. 16 illustrates a non-limiting example of a flow chart for a computer-implemented method in connection with the ultrasound imaging probe 102 (FIG. 1). It is to be appreciated that the ordering of the acts in the method is not limiting. As such, other orderings are contemplated herein. In addition, one or more acts may be omitted, and/or one or more additional acts may be included.

At 1602, the ultrasound imaging probe 102 is selected to be utilized in connection with an imaging mode for guiding vertical advancement of an instrument into a FOV, as described herein and/or otherwise. The imaging mode can be activated automatically, e.g., based on a selected imaging protocol, and/or on-demand, e.g., via the user turning on the mode via an on/off control. In one instance, thereafter, the mode can be toggled off and on by the user on-demand.

At 1604, the ultrasound imaging probe 102 is operated to image an interior of an object or subject, as described herein and/or otherwise. For example, the user can place the imaging surface of the ultrasound imaging probe 102 against the object or subject, where the ultrasound imaging probe 102 transmits a pressure wave that transverses the object or subject, receives reflections in response to the pressure wave interacting with matter inside of the object or subject, and generate and display a curve trapezoidal shaped ultrasound image on a display.

At 1606, graphical indicia is created based on the curve trapezoidal shaped ultrasound image and the ultrasound imaging probe 102 and, at 1608, the graphical indicia is superimposed over the curve trapezoidal shaped ultrasound image, as described herein and/or otherwise. For example, the image enhancer 328 (FIG. 3) receives the ultrasound image and determines a center of the sector ultrasound image 406, obtains a width of the ultrasound imaging probe 102 along a direction of a long axis of the transducer array from the probe data 330, and generates at least the vertical trajectory 618 and, optionally, also the vertical line 612, each based on the center and one half of the width.

As shown in FIGS. 6 and 7, both of the vertical lines 618 and 612 can be concurrently displayed. As shown in FIGS. 8 and 9, only the vertical line 618, which is at the end 116 of the probe head 112 of the ultrasound imaging probe 102 utilized to guide the instrument, is displayed. Furthermore, as shown in FIGS. 6, 8 and 9, the graphical indicia can further include the graphical representation 608 of the probe head 112 of the ultrasound imaging probe 102, and the vertical line 618 is located at the end 622 of the graphical representation 608 of the probe head 112 of the ultrasound imaging probe 102.

At 1610, the vertical trajectory 618 can be utilized to vertically guide an instrument into the FOV, as described herein and/or otherwise. At 1612, it is determined whether both of the vertical lines 612 and 618 will be utilized to mark a region in which an object of interest is located. Where it is determined that both of the vertical lines 612 and 618 will be utilized, at 1614 the user rotates the ultrasound imaging probe 102 between instrument advancement to align the vertical trajectories 612 and 618 with the object of interest, and acts 1604-1612 are repeated. Otherwise, the guidance ends. Again, the instrument can be advanced free-hand and/or using a physical guide.

The above can be implemented by way of computer readable instructions, encoded, or embedded on the computer readable storage medium, which, when executed by a computer processor, cause the processor to carry out the described acts or functions. Additionally, or alternatively, at least one of the computer readable instructions is carried out by a signal, carrier wave or other transitory medium, which is not computer readable storage medium.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include such additional elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only and are thus not intended to limit in any way the definition and/or meaning of the term "computer". The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Embodiments of the present disclosure shown in the drawings and described above are example embodiments only and are not intended to limit the scope of the appended claims, including any equivalents as included within the scope of the claims. Various modifications are possible and will be readily apparent to the skilled person in the art. It is intended that any combination of non-mutually exclusive features described herein are within the scope of the present disclosure. That is, features of the described embodiments can be combined with any appropriate aspect described above and optional features of any one aspect can be combined with any other appropriate aspect. Similarly, features set forth in dependent claims can be combined with non-mutually exclusive features of other dependent claims, particularly where the dependent claims depend on the same independent claim. Single claim dependencies may have been used as practice in jurisdictions that require them, but this should not be taken to mean that the features in the dependent claims are mutually exclusive.

What is claimed is:

1. An ultrasound imaging system, comprising:
an ultrasound imaging probe, including:
a probe head having a first width along a long axis; and
a transducer array at the probe head and having a second width along the long axis, wherein the first width is greater than the second width,
wherein the transducer array is configured to generate an electrical signal indicative of received echoes;
a beamformer configured to generate a sector shaped image based on the electrical signal;
an image enhancer configured to generate a graphical vertical trajectory corresponding to a vertical line from an end of the probe head into the sector shaped image; and
a display configured to display the graphical vertical trajectory superimposed over the sector shaped image, wherein the graphical vertical trajectory visually distinguishes a first region of the sector shaped image projecting directly under the probe head from a second region of the sector shaped image not projecting directly under the probe head.

2. The ultrasound imaging system of claim 1, wherein the first region is a rectangular shaped projection from ends of the probe head.

3. The ultrasound imaging system of claim 1, wherein the graphical vertical trajectory includes a straight vertical line.

4. The ultrasound imaging system of claim 1, wherein the graphical vertical trajectory corresponds to at least one of a visually enhanced and a visually suppressed boundary between the first and second regions.

5. The ultrasound imaging system of claim 1, wherein the graphical vertical trajectory corresponds to a boundary at which the second region is masked.

6. The ultrasound imaging system of claim 1, wherein the graphical vertical trajectory includes a single vertical trajectory at only a single end of the probe head.

7. The ultrasound imaging system of claim 1, wherein the graphical vertical trajectory includes a first vertical trajectory at a first end of the probe head and a second vertical trajectory at a second end of the probe head.

8. The ultrasound imaging system of claim 1, further including:
a processor configured to a toggle a display of the graphical vertical trajectory on and off.

9. The ultrasound imaging system of claim 1, further comprising:
a memory storing a mapping of a type or model of the ultrasound imaging probe to the first width, wherein the image enhancer places the graphical vertical trajectory at a location based on a center of the image and the first width.

10. The ultrasound imaging system of claim 9, wherein the location corresponds to a distance determined by adding half of the first width to a location at the center.

11. A computer-implemented method, comprising:
receiving, at a transducer array in a probe head of an ultrasound imaging probe, echoes generated in response to an interaction between an emitted ultrasound pressure wave and matter, and generating an electrical signal indicative of received echoes, wherein the head has a first width along a long axis, the transducer array has a second width along the long axis, and the first width is greater than the second width;
beamforming the electrical signal to generate a sector shaped image;
generating a graphical vertical trajectory corresponding to a vertical line from an end of the probe head into the sector shaped image; and
displaying the graphical vertical trajectory superimposed over the sector shaped image, wherein the graphical vertical trajectory visually distinguishes a first region of the image projecting directly under the probe head from and a second region of the sector shaped image outside of the region directly under the probe head.

12. The computer-implemented method of claim 11, further including:
positioning the graphical vertical trajectory at a location corresponding to an end of the head.

13. The computer-implemented method of claim 11, wherein the vertical trajectory provides a guide for vertical advancement of an instrument.

14. The computer-implemented method of claim 11, wherein the first region extends from an end of the probe head into the sector shaped image.

15. The computer-implemented method of claim 11, further including:
determining a location of the graphical vertical trajectory based on a center of the sector shaped image and the first width.

16. A non-transitory computer readable medium encoded with computer executable instructions, which, when executed by a processor, cause:
reception, at a transducer array in a probe head of an ultrasound imaging probe, echoes generated in response to an interaction between an emitted ultrasound pressure wave and matter, and generation of an electrical signal indicative of received echoes, wherein the head has a first width along a long axis, the transducer array has a second width along the long axis, and the first width is greater than the second width;
generation of a sector shaped image based on the electrical signal;
generation of a graphical vertical trajectory corresponding to a vertical line from an end of the probe head into the sector shaped image; and
display of the graphical vertical trajectory superimposed over the image, wherein the graphical vertical trajectory visually separates a first region of the sector shaped image corresponding to a rectangular plane projecting from the probe head from a remainder of the sector shaped image.

17. The non-transitory computer readable medium of claim 16, wherein the vertical trajectory provides a guide for vertical advancement of an instrument.

18. The non-transitory computer readable medium of claim 16, wherein the first region extends from ends of the probe head into the sector shaped image.

19. The non-transitory computer readable medium of claim 16, wherein the instructions further cause:
determining a location of the graphical vertical trajectory based on a center of the sector shaped image and the first width.

20. The non-transitory computer readable medium of claim 16, wherein the instructions further cause:
   determining a location of the graphical vertical trajectory by adding half of the first width to a center of the sector shaped image.

\* \* \* \* \*